United States Patent
Lee et al.

(10) Patent No.: US 11,262,880 B2
(45) Date of Patent: Mar. 1, 2022

(54) HIGH PERFORMANCE FILM-TYPE TOUCH SENSOR

(71) Applicant: DONGWOO FINE-CHEM CO., LTD., Iksan-si (KR)

(72) Inventors: Jae Hyun Lee, Uiwang-si (KR); Ju In Yoon, Pyeongtaek-si (KR); Keon Kim, Gungpo-si (KR); Byung Jin Choi, Incheon (KR)

(73) Assignee: Dongwoo Fine-Chem Co., Ltd., Jeollabuk-do (KR)

( * ) Notice: Subject to any disclaimer, the term of this patent is extended or adjusted under 35 U.S.C. 154(b) by 0 days.

(21) Appl. No.: 17/043,879

(22) PCT Filed: Mar. 29, 2019

(86) PCT No.: PCT/KR2019/003689
§ 371 (c)(1),
(2) Date: Sep. 30, 2020

(87) PCT Pub. No.: WO2019/190256
PCT Pub. Date: Oct. 3, 2019

(65) Prior Publication Data
US 2021/0034199 A1    Feb. 4, 2021

(30) Foreign Application Priority Data

Mar. 30, 2018    (KR) .................... 10-2018-0037377
Mar. 28, 2019    (KR) .................... 10-2019-0035466

(51) Int. Cl.
*G06F 3/044*    (2006.01)
*G06K 9/00*    (2006.01)

(52) U.S. Cl.
CPC ......... *G06F 3/0445* (2019.05); *G06K 9/0002* (2013.01)

(58) Field of Classification Search
CPC .................. G06F 3/0445; G06F 3/041; G06F 2203/04103
See application file for complete search history.

(56) References Cited

U.S. PATENT DOCUMENTS

2013/0048349 A1*    2/2013  Lin ....................... G06F 3/0443
                                                  174/255
2015/0193066 A1*    7/2015  Su ......................... G06F 3/0412
                                                  345/173
(Continued)

FOREIGN PATENT DOCUMENTS

JP    2016-173697 A    9/2016
KR    10-2014-0003728 A    1/2014
(Continued)

OTHER PUBLICATIONS

First Office Action issued in counterpart Korean Patent Appln. No. 10-2019-0035466 dated May 25, 2020, and its English translation.
(Continued)

*Primary Examiner* — Md Saiful A Siddiqui
(74) *Attorney, Agent, or Firm* — DLA Piper LLP (US)

(57) ABSTRACT

A high performance touch sensor according to the present invention comprises: a substrate; a first detection electrode formed on the substrate; an insulation layer formed on the first detection electrode; a second detection electrode formed on the insulation layer; and a protection layer formed on the second detection electrode, wherein one of the first detection electrode and the second detection electrode has a triple-film structure including a metal oxide and a thin film metal laminated on each other, and the other one includes a metal pattern. Therefore, the present invention can implement touch sensor having a high resolution and a large area while simultaneously satisfying a low resistance characteristic and
(Continued)

an optical characteristic, facilitate progress of a high-temperature process, and diversify the substrate.

14 Claims, 5 Drawing Sheets

(56) References Cited

U.S. PATENT DOCUMENTS

| | | | | |
|---|---|---|---|---|
| 2017/0012147 | A1* | 1/2017 | Cheong | H01L 31/022466 |
| 2017/0090663 | A1* | 3/2017 | Tang | G06F 3/0412 |
| 2017/0102797 | A1* | 4/2017 | Cok | H01L 25/167 |
| 2017/0160848 | A1* | 6/2017 | Cao | G06F 3/0446 |
| 2017/0168608 | A1* | 6/2017 | Kim | G06F 3/0446 |
| 2017/0246799 | A1* | 8/2017 | Yang | B29C 64/135 |
| 2018/0113536 | A1* | 4/2018 | Krasnov | G06F 3/0445 |
| 2019/0310730 | A1* | 10/2019 | Ishizaki | G06F 3/0445 |
| 2020/0089384 | A1* | 3/2020 | Wang | G06F 3/0443 |

FOREIGN PATENT DOCUMENTS

| | | |
|---|---|---|
| KR | 101372525 B1 | 3/2014 |
| KR | 10-2014-0059428 A | 5/2014 |
| KR | 10-2014-0133401 A | 11/2014 |
| KR | 10-2015-0032150 A | 3/2015 |
| KR | 10-2016-0122291 A | 10/2016 |
| KR | 10-2017-0073186 A | 6/2017 |
| KR | 10-2017-0076340 A | 7/2017 |

OTHER PUBLICATIONS

International Search Report and Written Opinion issued in counterpart PCT Appln. No. PCT/KR2019/003689 dated Jul. 18, 2019, and its English translation.

* cited by examiner

HIGH PERFORMANCE FILM-TYPE TOUCH SENSOR

TECHNICAL FIELD

This invention relates to a touch sensor and, more particularly, to a high performance touch sensor allowing low-resistance characteristics and optical characteristics to be concurrently satisfied and also allowing high resolution and a large area to be implemented.

Background Art

Generally, touch sensors are devices that detect a touch point in response to a touch when a user touches an image being displayed on a screen with a finger, a touch pen, or the like. According to technologies applied to the touch sensors, there are various types such as a capacitive type, a resistive film type, and a surface acoustic wave type using an infrared ray or ultrasonic wave.

Such a touch sensor is generally manufactured to have a structure mounted on a display device such as a liquid crystal display (LCD) or an organic light-emitting diode (OLED). Recently, research has been actively conducted on a thinner, lighter, and bendable film-type touch sensor using a polymer film, which replaces a glass substrate, as a base film.

Recently, as various functions are integrated in mobile devices, mobile devices to which a high resolution touch sensor is applied are gradually expanding. In particular, an application, which recognizes a user's fingerprint through the high resolution touch sensor and thus is applied to various security signatures, is being developed.

Meanwhile, in order for a touch sensor to perform a fingerprint recognition function, a pitch of a unit sensing cell constituting the touch sensor should be miniaturized sufficiently to detect a change in capacitance between a ridge and a valley of a user's fingerprint having a fine interval. In this case, in a process of miniaturizing the unit sensing cell, product defects may be caused, and since the pitch of the cell is narrowed in response to a resolution of the touch sensor and the number of channels is increased, an increase in resistance is inevitable.

RELATED ART DOCUMENTS

Patent Document

Korean Registered Patent Publication No. 10-1372525 (Registration Date: Mar. 4, 2014, Title: Method of manufacturing touch screen panel using photosensitive metal nanowire)

SUMMARY OF INVENTION

Technical Problem

A technical objective of the present invention is to provide a high performance touch sensor allowing low-resistance characteristics and optical characteristics to be concurrently satisfied and also allowing high resolution and a large area to be implemented.

Another technical objective of the present invention is to provide a high performance touch sensor, in which a pitch of a unit sensing cell constituting a touch sensor may be miniaturized sufficiently to detect a change in capacitance between a ridge and a valley of a user's fingerprint, an increase in resistance may also be suppressed to secure low-resistance characteristics, and concurrently, optical characteristics including light transmittance may be improved.

Solution to Problem

A high performance touch sensor according to the present invention includes a substrate, a first sensing electrode formed on the substrate, an insulating layer formed on the first sensing electrode, a second sensing electrode formed on the insulating layer, and a protective layer formed on the second sensing electrode, wherein one electrode of the first sensing electrode and the second sensing electrode has a triple-layered structure including a stacked metal oxide and a thin film metal, and the other electrode thereof includes a metal pattern.

The high performance touch sensor according to the present invention is characterized in that, in a plan view of the electrode including the metal pattern among the first sensing electrode and the second sensing electrode, unit patterns constituting the metal pattern may not intersect each other.

The high performance touch sensor according to the present invention is characterized in that the unit patterns constituting the metal pattern may have a stripe shape.

The high performance touch sensor according to the present invention is characterized in that a boundary surface of the unit patterns having the stripe shape may have a curved shape.

The high performance touch sensor according to the present may further include a pad electrode connected to the electrode including the metal pattern among the first sensing electrode and the second sensing electrode.

The high performance touch sensor according to the present invention is characterized in that the pad electrode may be made of the same material as the electrode including the metal pattern among the first sensing electrode and the second sensing electrode.

The high performance touch sensor according to the present invention is characterized in that the protective layer may partially cover the pad electrode.

The high performance touch sensor according to the present invention may further include a pad protection electrode formed on the pad electrode to protect the pad electrode.

The high performance touch sensor according to the present invention is characterized in that the electrode having the triple-layered structure among the first sensing electrode and the second sensing electrode may have a structure in which the metal oxide, the thin film metal, and the metal oxide are sequentially stacked.

The high performance touch sensor according to the present invention is characterized in that a line width of the electrode including the metal pattern among the first sensing electrode and the second sensing electrode may be 1 μm or more and 8 μm or less.

The high performance touch sensor according to the present invention is characterized in that a sheet resistance of the electrode having the triple-layered structure among the first sensing electrode and the second sensing electrode may be 3 Ω/sq or more and 10 Ω/sp or less.

The high performance touch sensor according to the present invention is characterized in that a light transmittance of the electrode having the triple-layered structure among the first sensing electrode and the second sensing electrode may be 80% or more and 93% or less.

The high performance touch sensor according to the present invention is characterized in that a light transmittance of the touch sensor including the substrate, the first sensing electrode, the insulating layer, the second sensing electrode, and the protective layer may be 80% or more and 90% or less.

The high performance touch sensor according to the present invention is characterized in that a sum of line resistances of electrodes constituting one unit sensing cell among a plurality of unit sensing cells that correspond to a cross region between the first sensing electrode and the second sensing electrode may be 13Ω or more and 90Ω or less.

The high performance touch sensor according to the present invention is characterized in that the electrodes including the thin film metal and the metal pattern may include at least one selected from the group consisting of silver (Ag), copper (Cu), calcium (Ca), nickel (Ni), aluminum (Al), chromium (Cr), molybdenum (Mo), cobalt (Co), titanium (Ti), palladium (Pd), indium (In), tungsten (W), cadmium (Cd), and an alloy thereof.

The high performance touch sensor according to the present invention may further include a separation layer formed between the substrate and the first sensing electrode.

The high performance touch sensor according to the present invention may further include an inner protective layer formed between the separation layer and the first sensing electrode.

The high performance touch sensor according to the present invention is characterized in that a size of a pitch of one unit sensing cell among a plurality of unit sensing cells that correspond to a cross region between the first sensing electrode and the second sensing electrode may be 50 μm or more and 110 μm or less.

Advantageous Effects of Invention

According to the present invention, there is an effect of providing a high performance touch sensor allowing low-resistance characteristics and optical characteristics to be concurrently satisfied and also allowing high resolution and a large area to be implemented, and a method of manufacturing the same.

In addition, there is an effect of providing a high performance touch sensor and a method of manufacturing the same, in which a pitch of a unit sensing cell constituting a touch sensor can be miniaturized sufficiently to detect a change in capacitance between a ridge and a valley of a user's fingerprint, an increase in resistance can also be suppressed to secure low-resistance characteristics, and concurrently, optical characteristics including light transmittance can be improved.

DETAILED DESCRIPTION OF EMBODIMENT

Since specific structural or functional descriptions for embodiments according to the concept of the invention disclosed herein are merely exemplified for purposes of describing the embodiments according to the concept of the invention, the embodiments according to the concept of the invention may be embodied in various forms but are not limited to the embodiments described herein.

While the embodiments of the present invention are susceptible to various modifications and alternative forms, specific embodiments thereof are shown by way of example in the accompanying drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another element. For example, a first element could be termed a second element, and similarly, a second element could be termed a first element, without departing from the scope of the present invention.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting to the invention. A single form of expression is meant to include multiple elements unless otherwise stated. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal detect unless expressly so defined herein.

Hereinafter, exemplary embodiments of the present invention will be described in detail with reference to the accompanying drawings.

Figure 1:
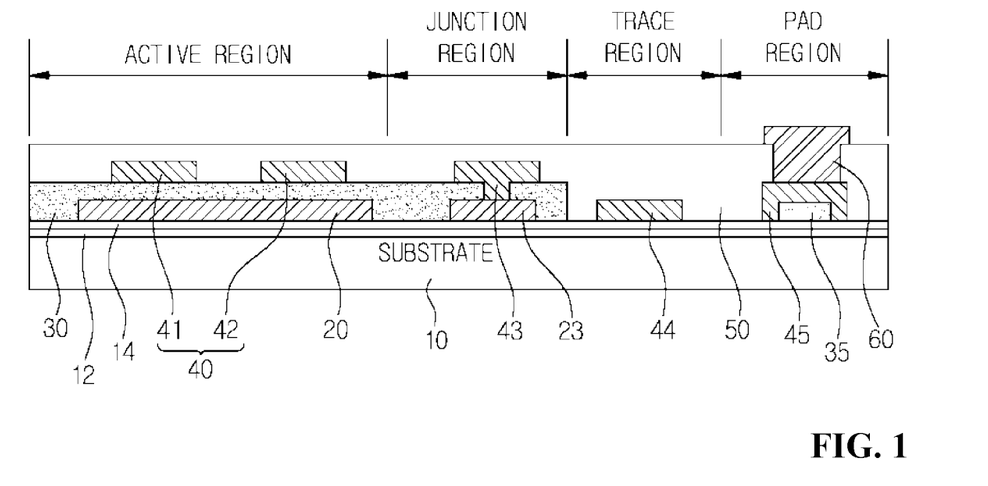
FIG. 1 is a view illustrating a high performance touch sensor according to a first embodiment of the present invention.
Figure 2:
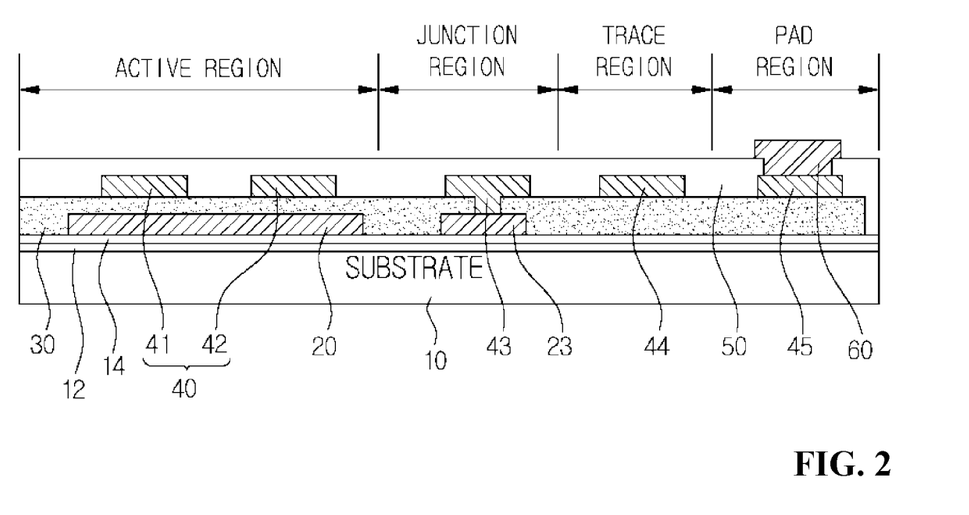
FIG. 2 is a view illustrating a high performance touch sensor according to a second embodiment of the present invention.
Figure 3:
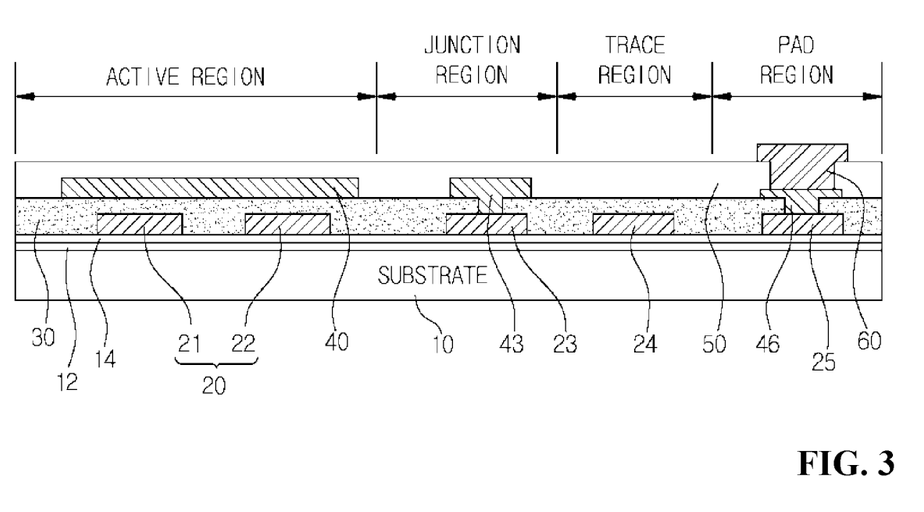
FIG. 3 is a view illustrating a high performance touch sensor according to a third embodiment of the present invention.

FIG. 1 is a view illustrating a high performance touch sensor according to a first embodiment of the present invention. FIG. 2 is a view illustrating a high performance touch sensor according to a second embodiment of the present invention. FIG. 3 is a view illustrating a high performance touch sensor according to a third embodiment of the present invention. As will be described below, the first and second embodiments have a structure in which an electrode having a triple-layered structure is positioned at a lower side, and conversely, the third embodiment has a structure in which an electrode having a triple-layered structure is positioned at an upper side.

Referring to FIG. 1, the high performance touch sensor according to the first embodiment of the present invention includes a substrate 10, a separation layer 12, an inner protective layer 14, a first sensing electrode 20, an insulating layer 30, a second sensing electrode 40, a pad electrode 45, a protective layer 50, and a pad protection electrode 60.

First, regions such as an active region AR, a junction region JR, a trace region TR, and a pad region PR, which functionally partition the high performance touch sensor according to the embodiments of the present invention, will be defined.

The active region AR is a region in which an image provided by a device coupled to the touch sensor is displayed as well as being a region in which a touch signal input from a user is detected. The active region AR is provided with a plurality of sensing electrode patterns formed in directions intersecting each other. Hereinafter, as will be described in detail, for example, the sensing electrode patterns constituting the touch sensor may include the first sensing electrode 20 and the second sensing electrode 40 which are formed to intersect each other in a state of being insulated from each other by the insulating layer 30.

The pad region PR is provided with bonding pad patterns to which a flexible printed circuit (FPC), which transmits a touch signal detected by the sensing electrode patterns provided in the active region AR to a driver (not shown), is connected.

The junction region JR and the trace region TR are provided with lines which electrically connect the sensing electrode patterns provided in the active region AR and the bonding pad patterns provided in the pad region PR.

The substrate 10 serves to structurally support the components of the high performance touch sensor according to the first embodiment of the present invention.

For example, the substrate 10 may include a rigid material having high heat resistance and chemical resistance, such as glass or stainless steel (SUS), or may include a flexible material having excellent flexible properties.

As a more specific example, the substrate 10 may be implemented in the form of a base film made of any material having excellent flexible and light transmission properties.

For example, the base film may be a transparent optical film or a polarizing plate.

For example, a film having excellent transparency, mechanical strength, and thermal stability may be used as the transparent optical film. A specific example of the transparent optical film may include a film made of at least one selected from thermoplastic resins including a polyester-based resin such as polyethylene terephthalate, polyethylene isophthalate, polyethylene naphthalate, or polybutylene terephthalate, a cellulose-based resin such as diacetyl cellulose or triacetyl cellulose, a polycarbonate-based resin, an acrylic-based resin such as polymethyl(meth)acrylate or polyethyl(meth)acrylate, a styrene-based resin such as polystyrene or an acrylonitrile-styrene copolymer, a polyolefin-based resin such as polyethylene, cyclic-based polyolefin, polyolefin having a norbornene structure, or an ethylene-propylene copolymer, a vinyl chloride-based resin, an amide-based resin such as nylon or aromatic polyamide, an imide-based resin, a polyethersulfone-based resin, a sulfone-based resin, a polyether ether ketone-based resin, a polyphenylene sulfide-based resin, a vinyl alcohol-based resin, a vinylidene chloride-based resin, a vinyl butyral-based resin, an allylate-based resin, a polyoxymethylene-based resin, and an epoxy-based resin. In addition, a film made of a blend of the above-described thermoplastic resins may be used. Furthermore, a film made of a thermosetting resin based on (meth)acrylate, urethane, acrylic urethane, epoxy, or silicone, or an ultraviolet (UV)-curable resin may also be used. A thickness of the above-described transparent optical film may be appropriately determined but may be generally determined to be in a range of 1 μm to 500 μm in consideration of strength, workability such as handleability, thin layer formability, or the like. In particular, the thickness of the transparent optical film is preferably in a range 1 μm to 300 μm and, more preferably, in a range of 5 μm to 200 μm.

The transparent optical film may include one or more appropriate additives. Examples of the additives may include an UV absorber, an antioxidant, a lubricant, a plasticizer, a release agent, a coloration preventing agent, a flame retardant, a nucleating agent, an antistatic agent, a pigment, a coloring agent, and the like. The transparent optical film may have a structure including various functional layers such as a hard coating layer, an antireflection layer, and a gas barrier layer on one or both sides of a film. The functional layers are not limited to the above-described layers, and various functional layers may be used according to use thereof.

In addition, if necessary, the transparent optical film may be surface-treated. Examples of such surface treatment may include dry treatment such as plasma treatment, corona treatment, or primer treatment, and chemical treatment such as alkali treatment including saponification treatment.

In addition, the transparent optical film may be an isotropic film, a retardation film, or a protective film.

When the transparent optical film is the isotropic film, an in-plane retardation (Ro) is 40 nm or less and, preferably, 15 nm or less (wherein Ro=[nx−ny]×d], nx and ny refer to a main refractive index in a film plane, and d refers to a film thickness), and a retardation (Rth) in a thickness direction is in a range of −90 nm to +75 nm, preferably, in a range of −80 nm to +60 nm and, particularly, in a range of −70 nm to +45 nm (wherein Rth=[(nx+ny)/2−nz]×d), nx and ny refer to a main refractive index in a film plane, and nz refers to a refractive index in the thickness direction of the film, andd refers to a film thickness.

The retardation film may be a film manufactured through a method of uniaxially or biaxially stretching a polymer film, applying a polymer, or applying a liquid crystal. The retardation film may be used for improvement or control of optical characteristics, such as viewing angle compensation, color sensitivity improvement, light leakage prevention, or color aesthetic control of a display. Types of the retardation film include a half-wave or quarter-wave plate, a positive C-plate, a negative C-plate, a positive A-plate, a negative A-plate, and a biaxial plate.

The protective film may be a polymer resin film including an adhesive layer on at least one surface thereof or a self-adhesive film made of polypropylene. The protective film may be used for protection of a surface of the touch sensor and improvement of processibility.

The polarizing plate may be any one known to be used in a display panel. Specifically, the polarizing plate may be formed by installing the protective layer 50 on at least one surface of a polarizer obtained by stretching a polyvinyl alcohol film and dyeing the stretched polyvinyl alcohol film with iodine or a dichroic pigment, by orienting a liquid crystal to provide performance of a polarizer thereto, or by applying an oriented resin such as polyvinyl alcohol on a transparent film and stretching and dyeing the transparent film, but the present invention is not limited thereto.

When the substrate 10 is implemented as a film formed of a flexible material, in a state in which components including the first sensing electrode 20 and the second sensing electrode 40 are formed on a rigid carrier substrate made of glass, SUS, or the like during a manufacturing process, the separation layer 12 and the inner protective layer 14 formed between the substrate 10 and the first sensing electrode 20 performs a function of separating the components from the carrier substrate. Additionally, the inner protective layer 14 formed on the separation layer 12 also performs a function of protecting the separation layer 12 in a process of depositing and etching the first sensing electrode 20, the second sensing electrode 40, and the like.

The first sensing electrode 20 formed in the active region AR of the substrate 10 performs a sensing electrode function of sensing a touch signal of a user together with the second sensing electrode 40 to be described below.

Meanwhile, as described in description of the problems of the related art, in order for a touch sensor to perform a fingerprint recognition function, a pitch of a unit sensing cell constituting the touch sensor should be miniaturized sufficiently to detect a change in capacitance between a ridge and a valley of a user's fingerprint having a fine interval. In this case, in a process of miniaturizing the unit sensing cell, product defects may be caused, and since the pitch of the cell is narrowed in response to a resolution of the touch sensor and the number of channels is increased, an increase in resistance is inevitable.

However, according to the first embodiment of the present invention, a pitch of a unit sensing cell constituting the touch sensor can be miniaturized sufficiently to detect a change in capacitance between a ridge and a valley of a user's fingerprint, an increase in resistance can also be suppressed to secure low-resistance characteristics, and concurrently, optical characteristics including light transmittance can be improved.

Hereinafter, a main technical configuration applied to the first embodiment of the present invention to concurrently achieve the technical objects of securing low-resistance characteristics and improving optical characteristics of the touch sensor will be described.

In the first embodiment of the present invention, the first sensing electrode 20 formed on the substrate 10 may have a triple-layered structure including a stacked metal oxide and thin film metal, and the second sensing electrode 40 may include a metal pattern.

In the first embodiment of the present invention, such configurations applied to the first sensing electrode 20 and the second sensing electrode 40 overcome a contradictory relationship between resistance characteristics and optical characteristics and convert the contradictory relationship into a complementary relationship, thereby providing a touch sensor capable of concurrently acquiring low-resistance characteristics and excellent optical characteristics.

This will be described in more detail as follows.

In the first sensing electrode 20 formed to have the triple-layered structure, low-resistance characteristics are relatively lowered, but optical characteristics including light transmittance are excellent as compared with another electrode, that is, the second sensing electrode 40 including the metal pattern.

On the other hand, in the second sensing electrode 40 including the metal pattern, since resistance is lower as compared with another electrode, that is, the first sensing electrode 20 formed to have the triple-layered structure, low-resistance characteristics are relatively improved, but optical characteristics including light transmittance (for example, visibility and haze) are lowered.

Accordingly, when the first sensing electrode 20 is formed to have the triple-layered structure including the stacked metal oxide and thin film metal and the second sensing electrode 40 is formed to include the metal pattern, since the first sensing electrode 20 and the second sensing electrode 40 have a complementary relationship in view of low-resistance characteristics and optical characteristics, it is possible to provide a high performance touch sensor having low-resistance characteristics and excellent optical characteristics.

For example, the first sensing electrode 20 having the triple-layered structure may be formed to have a triple-layered structure in which a metal oxide, a thin film metal, and a metal oxide are sequentially stacked.

For example, in a plan view of the second sensing electrode 40 including the metal pattern, unit patterns constituting the metal pattern may be formed so as to not intersect each other differently from a known metal mesh. That is, the unit patterns constituting the metal pattern may be formed to not intersect each other in the active region AR but may be formed to intersect each other in the junction region JR positioned outside the active region AR. When the unit patterns are formed as described above, a light transmittance of the second sensing electrode 40 including the metal pattern can be increased as compared with a known metal mesh pattern.

Figure 4:
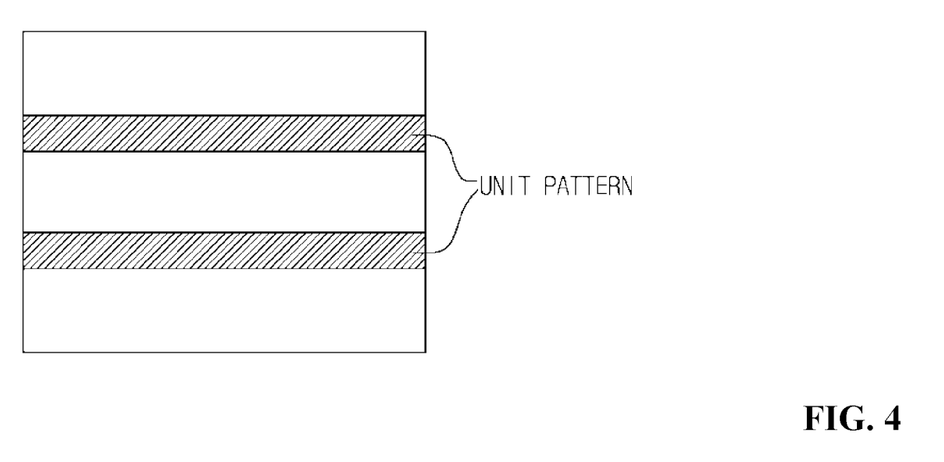
FIG. 4 is a view illustrating one exemplary shape of unit patterns constituting a metal pattern according to one embodiment of the present invention.
Figure 5:
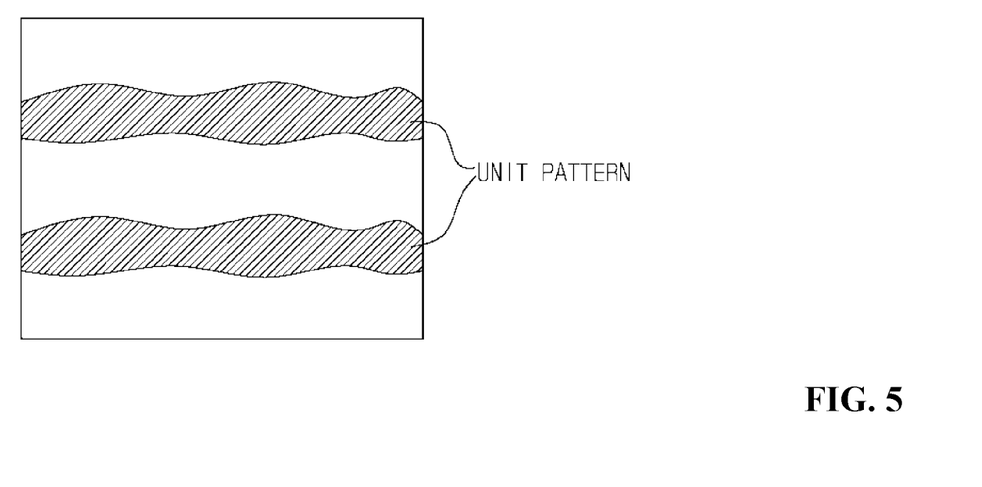
FIG. 5 is a view illustrating another exemplary shape of unit patterns constituting a metal pattern according to one embodiment of the present invention.

FIGS. 4 and 5 are views illustrating exemplary shapes of unit patterns constituting a metal pattern according to one embodiment of the present invention.

For example, referring additionally to FIGS. 4 and 5, the unit patterns constituting the metal pattern may be formed to have a stripe shape, and the stripe shape may include a straight line or a curved line. As shown in FIG. 5, the stripe shape including the curved line means that a boundary surface of the unit patterns having the stripe shape has a curved shape. As described above, when the unit patterns constituting the metal pattern are formed to have the stripe shape, as compared with a conventional metal mesh pattern, the occurrence of a moire is small and a haze is minor so that optical characteristics are improved.

For example, a line width of the second sensing electrode 40 including the metal pattern may be 1 µm or more and 8 µm or less. When the line width is 1 µm or more and 8 µm or less, low-resistance characteristics and excellent optical characteristics can be concurrently secured. When the line width is less than 1 optical characteristics including light transmittance are improved, but resistance is increased, which makes it difficult to secure low-resistance characteristics. When the line width exceeds 8 µm, resistance is decreased, which is advantageous for securing low-resistance characteristics, but light transmittance is lowered, which lowers optical characteristics. In terms of concurrently securing low-resistance characteristics and excellent optical characteristics, it is more preferable that the line width is 1 µm or more and 3.5 µm or less.

Experimental data for demonstrating such a critical significance are disclosed in Tables 1 and 2 below.

Table 1 shows experimental data according to a related art, and when both of two electrodes are electrodes including a metal pattern, Table 1 shows experimental data about resistance characteristics and optical characteristics according to a line width of the electrode. Table 2 shows experimental data according to one embodiment of the present invention, and when one of the first sensing electrode 20 and the second sensing electrode 40 has a triple-layered structure including a stacked metal oxide and thin film metal and the other thereof is an electrode including a metal pattern, Table 2 shows experimental data about resistance characteristics and optical characteristics according to a line width of the electrode including the metal pattern.

TABLE 1

| Line width (μm) | 15 | 12 | 10 | 8 | 7 | 5 | 3.5 | 2.5 | 2 | 1.5 | 1 | 0.7 |
|---|---|---|---|---|---|---|---|---|---|---|---|---|
| Resistance (Ω) | 1.7 | 2.1 | 2.5 | 3.2 | 3.6 | 5.0 | 7.2 | 10.1 | 12.6 | 16.8 | 25.2 | 36.0 |
| Transmittance (%) | 66.8 | 68.2 | 69.9 | 72.1 | 74.4 | 77.7 | 78.1 | 79.7 | 80.1 | 80.9 | 81.2 | 82.1 |
| Visibility | x | x | x | x | x | x | x | Δ | Δ | Δ | ○ | ○ |
| Haze | 19.0 | 17.0 | 14.0 | 12.1 | 10.9 | 9.2 | 7.9 | 6.5 | 5.8 | 4.3 | 3.1 | 2.2 |

TABLE 2

| Line width (μm) | 15 | 12 | 10 | 8 | 7 | 5 | 3.5 | 2.5 | 2 | 1.5 | 1 | 0.7 |
|---|---|---|---|---|---|---|---|---|---|---|---|---|
| Resistance (Ω) | 13.14 | 20.08 | 24.30 | 30.2 | 36.6 | 43.0 | 50.2 | 56.3 | 65.2 | 78.2 | 90.0 | 110.3 |
| Transmittance (%) | 75.0 | 76.5 | 78.3 | 80.7 | 81.5 | 82.1 | 83.4 | 84.5 | 86.8 | 88.1 | 90.0 | 90.5 |
| Visibility | x | x | x | Δ | Δ | Δ | ○ | ○ | ○ | ○ | ○ | ○ |
| Haze | 8.0 | 5.6 | 4.3 | 3.2 | 2.5 | 1.5 | 1.0 | 0.8 | 0.4 | 0.3 | 0.2 | 0.2 |

In an experiment above, resistance is the sum of line resistances of electrodes constituting one unit sensing cell among a plurality of unit sensing cells that correspond to a cross region between the first sensing electrode 20 and the second sensing electrode 40 and has a value obtained using K-9510AT (manufactured by MIK21 Company), transmittance has a value obtained using Konica-Minolta CM-3300D, visibility is a result evaluated based on the number of people who feel that a pattern is visibly recognizable in an experimental group of 100 people, ○ refers to when five people or less recognize a pattern, Δ refers to when six people or more and ten people or less recognize a pattern, x refers to when ten people or more recognize a pattern, and a haze has a value obtained using Haze-Meter (HM-150).

For example, a sheet resistance of the first sensing electrode 20 having the triple-layered structure may be 3 Ω/sq or more and 10 Ω/sq or less, and a light transmittance thereof may be 80% or more and 93% or less. When the sheet resistance of the first sensing electrode 20 having the triple-layered structure is 3 Ω/sq or more and 10 Ω/sq or less and the light transmittance thereof is 80% or more and 93% or less, it is possible to secure high light transmittance, which is an advantage of an electrode having a triple-layered structure, and concurrently minimize a decrease in low-resistance characteristics due to an increase in resistance. When the sheet resistance is less than 3 Ω/sq, a thin film metal of a triple layer becomes thick, and thus, visibility becomes lower. When the sheet resistance exceeds 10 Ω/sq, a high performance touch sensor is not smoothly driven. In addition, when the light transmittance is less than 80%, visibility becomes lower, and when the light transmittance exceeds 93%, a thin film metal of a triple layer becomes thick, and thus, an increase in resistance is inevitable.

For example, in order to secure optical characteristics of the touch sensor, it is preferable that a light transmittance of the touch sensor including the substrate 10, the first sensing electrode 20, the insulating layer 30, the second sensing electrode 40, and the protective layer 50 is 80% or more and 90% or less.

In addition, in order to secure electrical driving characteristics including, for example, a response speed of the touch sensor, it is preferable that the sum of the line resistances of the electrodes constituting one unit sensing cell among the plurality of unit sensing cells that correspond to the cross region between the first sensing electrode 20 and the second sensing electrode 40 is 13Ω or more and 90Ω or less.

Furthermore, for example, in order to stably recognize a user's fingerprint without errors, it is preferable that a size of a pitch of one unit sensing cell among the plurality of unit sensing cells that correspond to the cross region between the first sensing electrode 20 and the second sensing electrode 40 is 50 μm or more and 110 μm or less.

As described above, when the light transmittance of the touch sensor is set to be 80% or more and 90% or less, the sum of the line resistances of the electrodes constituting one unit sensing cell among the plurality of unit sensing cells that correspond to the cross region between the first sensing electrode 20 and the second sensing electrode 40 is set to be 13Ω or more and 90Ω or less, and the size of the pitch of one unit sensing cell among the plurality of unit sensing cells that correspond to the cross region between the first sensing electrode 20 and the second sensing electrode 40 is 50 μm or more and 110 μm or less, the pitch of the unit sensing cell constituting the touch sensor can be miniaturized sufficiently to detect a change in capacitance between a ridge and a valley of a user's fingerprint, an increase in resistance can also be suppressed to secure low-resistance characteristics, and concurrently, optical characteristics including light transmittance can be improved.

In order to help understand the structure and function of the touch sensor, more specific configurations of the first sensing electrode 20 and the second sensing electrode 40 will be exemplarily described as follows.

For example, sensing patterns constituting the first sensing electrode 20 and the second sensing electrode 40 may be formed to have an appropriate shape according to the needs of an electronic device to which the sensing patterns are applied. For example, when the sensing patterns are applied to a touch screen panel, the sensing patterns may be formed as two types of patterns such as a pattern for sensing an x-coordinate and a pattern for sensing a y-coordinate, but the present invention is not limited thereto.

For example, the first sensing electrode 20 may be formed in a first direction, the second sensing electrode 40 may be formed in a second direction, and the second direction intersects the first direction. For example, when the first direction is an X-direction, the second direction may be a Y-direction. The first sensing electrode 20 and the second sensing electrode 40 are electrically insulated from each other by the insulating layer 30 to be described below. For example, a metal oxide may include at least one selected from the group consisting of indium tin oxide (ITO), indium zinc oxide (IZO), indium zinc tin oxide (IZTO), aluminum zinc oxide (AZO), zinc oxide ($ZnO_x$), indium oxide ($InO_x$), tin oxide ($SnO_x$), cadmium tin oxide (CTO), gallium-doped zinc oxide (GZO), zinc tin oxide (ZTO), and indium gallium oxide (IGO). Electrodes including a thin film metal and a metal pattern may include one selected from the group consisting of silver (Ag), copper (Cu), calcium (Ca), nickel (Ni), aluminum (Al), chromium (Cr), molybdenum (Mo), cobalt (Co), titanium (Ti), palladium (Pd), indium (In), tungsten (W), cadmium (Cd), and an alloy thereof, but the present invention is not limited thereto.

The thickness of the first sensing electrode 20 and the second sensing electrode 40 is not particularly limited, but in consideration of the flexibility and excellent resistance characteristics of the touch sensor, it is preferable that the thickness is in a range of 300 Å to 2,800 Å.

A lower junction portion 23 formed in the junction region JR may be made of the same material as the first sensing electrode 20 and may be formed together with the first sensing electrode 20 in a process of forming the first sensing electrode 20.

The insulating layer 30 is formed in a region including the first sensing electrode 20 and electrically insulates the first sensing electrode 20 from the second sensing electrode 40. For example, the insulating layer 30 may be formed to completely cover the first sensing electrode 20 and may be formed such that the lower junction portion 23 is partially exposed through a contact hole. In a process of forming the insulating layer 30, an insulating pattern 35 may be formed in a portion of the pad region PR in which the pad electrode 45 is formed.

As a material of the insulating layer 30 that insulates the first sensing electrode 20 from the second sensing electrode 40, an insulating material known in the art including an organic material and an inorganic material may be used without limitation, and for example, a metal oxide such as silicon oxide, a photosensitive resin composition including an acrylic-based resin, or a thermosetting resin composition may be used. Alternatively, the insulating layer 30 may be formed using an inorganic material such as silicon oxide ($SiO_x$) and, in this case, may be formed through a method such as a deposition method or a sputtering method.

The second sensing electrode 40 is formed to be opposite to the first sensing electrode 20 in the active region AR of the insulating layer 30 and includes a metal pattern.

For example, in a process of forming the second sensing electrode 40, an upper junction portion 43 that is electrically connected to the lower junction portion 23 may be formed in the junction region JR, a trace portion 44 may be formed in the trace region TR, and the pad electrode 45 covering the insulating pattern 35 may be formed in the pad region PR. The upper junction portion 43, the trace portion 44, and the pad electrode 45 may be made of the same material as the second sensing electrode 40.

The protective layer 50 is formed on the insulating layer 30, on which the second sensing electrode 40 and the upper junction portion 43 are formed, the trace portion 44, and the pad electrode 45 such that at least a portion of the pad electrode 45 is exposed through a contact hole or the like.

For example, the protective layer 50 may be made of an insulating material and may be formed to completely cover the second sensing electrode 40 positioned in the active region AR, the upper junction portion 43 positioned in the junction region JR, and the trace portion 44 positioned in the trace region TR. In addition, the protective layer 50 may be formed such that the pad electrode 45 positioned in the pad region PR is partially or entirely exposed, thereby insulating and protecting internal components from the outside.

As a material of the protective layer 50, an insulating material known in the art may be used without limitation, and for example, a metal oxide such as silicon oxide, a photosensitive resin composition including an acrylic-based resin, or a thermosetting resin composition may be used. Alternatively, the protective layer 50 may be formed using an inorganic material such as silicon oxide (SiOx) and, in this case, may be formed through a method such as a deposition method or a sputtering method.

The pad protection electrode 60 is formed on at least a portion of the pad electrode 45 to perform a function of preventing a corrosion phenomenon of the pad electrode 45 caused by moisture or the like introduced from the outside.

For example, the pad protection electrode 60 may include at least one selected from the group consisting of ITO, IZO, IZTO, AZO, $ZnO_x$, $InO_x$, $SnO_x$, CTO, GZO, ZTO, and IGO, but the present invention is not limited thereto.

As in the first embodiment described in detail above, in the high performance touch sensor according to the second embodiment of the present invention shown in FIG. 2, since a first sensing electrode 20 has a triple-layered structure including a stacked metal oxide and thin film metal and a second sensing electrode 40 has a configuration including a metal pattern, the descriptions of the first embodiment may also be applied to the second embodiment in substantially the same manner.

However, the second embodiment differs from the first embodiment in a shape of an insulating layer 30. That is, according to the second embodiment, the insulating layer 30 is formed in a region including the first sensing electrode 20 and electrically insulates the first sensing electrode 20 from the second sensing electrode 40. For example, the insulating layer 30 partially exposes a lower junction portion 23 formed in a junction region JR through a contact hole and is stacked on entire surfaces of the first sensing electrode 20 and a substrate 10. Accordingly, a trace portion 44 and a pad electrode 45 are positioned on the insulating layer 30.

FIG. 3 is a view illustrating the high performance touch sensor according to the third embodiment of the present invention.

Referring to FIG. 3, as opposed to the first and second embodiments, the high performance touch sensor according to the third embodiment of the present invention has a structure in which an electrode having a triple-layered structure is positioned at an upper side. That is, according to the third embodiment, a first sensing electrode 20 formed on a substrate 10 includes a metal pattern, and a second sensing electrode 40 formed on an insulating layer 30 has a triple-layered structure including a stacked metal oxide and thin film metal.

In the third embodiment of the present invention, such configurations applied to the first sensing electrode 20 and the second sensing electrode 40 overcome a contradictory relationship between resistance characteristics and optical characteristics and convert the contradictory relationship into a complementary relationship, thereby providing a touch sensor capable of concurrently acquiring low-resistance characteristics and excellent optical characteristics.

This will be described in more detail as follows.

In the first sensing electrode 20 including the metal pattern, optical characteristics including light transmittance are relatively lowered, but low-resistance characteristics are excellent as compared with another electrode, that is, the second sensing electrode 40 formed to have the triple-layered structure.

On the other hand, in the second sensing electrode 40 having the triple-layered structure, optical characteristics including light transmittance are excellent, but low-resistance characteristics are relatively lowered as compared with another electrode, that is, the first sensing electrode 20 including the metal pattern.

Accordingly, when the first sensing electrode 20 is formed to include the metal pattern and the second sensing electrode 40 is formed to have the triple-layered structure including the stacked metal oxide and thin film metal, since the first sensing electrode 20 and the second sensing electrode 40 have a complementary relationship in view of low-resistance characteristics and optical characteristics, a high performance touch sensor having low-resistance characteristics and excellent optical characteristics is provided.

For example, the second sensing electrode 40 having the triple-layered structure may be formed to have a triple-layered structure in which a metal oxide, a thin film metal, and a metal oxide are sequentially stacked.

For example, a line width of the first sensing electrode 20 including the metal pattern may be 1 µm or more and 8 µm or less. When the line width is 1 µm or more and 8 µm or less, low-resistance characteristics and excellent optical characteristics can be concurrently secured. When the line width is less than 1 optical characteristics including light transmittance are improved, but resistance is increased, which makes it difficult to secure low-resistance characteristics. When the line width exceeds 8 µm, resistance is decreased, which is advantageous for securing low-resistance characteristics, but light transmittance is lowered, which lowers optical characteristics.

For example, a sheet resistance of the thin film metal applied to the second sensing electrode 40 having the triple-layered structure may be 3 Ω/sq or more and 10 Ω/sq or less, and a light transmittance thereof may be 80% or more and 93% or less. When the sheet resistance of the thin film metal is 3 Ω/sq or more and 10 Ω/sq or less and the light transmittance thereof is 80% or more and 93% or less, it is possible to secure high light transmittance which is an advantage of an electrode having a triple-layered structure and concurrently minimize a decrease in low-resistance characteristics due to an increase in resistance.

For example, in a process of forming the first sensing electrode 20, a lower junction portion 23 may be formed in a junction region JR, a trace portion 24 may be formed in a trace region TR, and a pad electrode 25 may be formed in a pad region PR. The lower junction portion 23, the trace portion 24, and the pad electrode 25 may be made of the same material as the first sensing electrode 20.

An insulating layer 30 is stacked such that at least a portion of the lower junction portion 23 and at least a portion of the pad electrode 25 are exposed through contact holes. The second sensing electrode 40 is formed to have a structure opposite to the first sensing electrode 20 with the insulating layer interposed therebetween.

For example, in a process of forming the second sensing electrode 40, an upper junction portion 43 to be electrically connected to the lower junction portion 23 may be formed in the junction region JR, and an intermediate conductor pattern 46 to be electrically connected to the pad electrode 25 may be formed in the pad region PR. The upper junction portion 43 and the intermediate conductor pattern 46 may be made of the same material as the second sensing electrode 40.

For example, the protective layer 50 may be made of an insulating material and may be formed to completely cover the second sensing electrode 40 positioned in an active region AR and the upper junction portion 43 positioned in the junction region JR. In addition, the protective layer 50 may be formed such that the intermediate conductor pattern 46 electrically connected to the pad electrode 25 positioned in the pad region PR is partially or entirely exposed, thereby insulating and protecting internal components from the outside.

A pad protection electrode 60 is formed on at least a portion of the intermediate conductor pattern 46 electrically connected to the pad electrode 25 to perform a function of preventing a corrosion phenomenon of the pad electrode 25 caused by moisture or the like introduced from the outside.

Excluding such differences, since the third embodiment has substantially the same technical features as the first and second embodiments, the descriptions of the first and second embodiments may also be applied to the third embodiment in substantially the same manner.

As described above, according to the present invention, there is an effect of providing a high performance touch sensor capable of concurrently satisfying low-resistance characteristics and optical characteristics and also allowing high resolution and a large area to be implemented.

In addition, there is an effect of providing a high performance touch sensor in which a pitch of a unit sensing cell constituting a touch sensor can be miniaturized sufficiently to detect a change in capacitance between a ridge and a valley of a user's fingerprint, an increase in resistance can also be suppressed to secure low-resistance characteristics, and concurrently, optical characteristics including light transmittance can be improved.

DESCRIPTIONS OF REFERENCE NUMERALS

AR: active region
JR: junction region
TR: trace region
PR: pad region
10: substrate
12: separation layer
14: inner protective layer
20: first sensing electrode
23: lower junction
24, 44: trace portion
25, 45: pad electrode
30: insulating layer
40: second sensing electrode
43: upper junction portion
50: protective layer
60: pad protection electrode

What is claimed is:
1. A high performance touch sensor comprising:
a substrate;
a first sensing electrode formed on the substrate;
an insulating layer formed on the first sensing electrode;
a second sensing electrode formed on the insulating layer; and a protective layer formed on the second sensing electrode, wherein one electrode of the first sensing electrode and the second sensing electrode has a triple-layered structure in which metal oxide, thin film metal, and the metal oxide are sequentially stacked, and the other electrode thereof includes a metal pattern, wherein a line width of the electrode including the metal pattern among the first sensing electrode and the second sensing electrode is 1 μm or more and 8 μm or less, wherein a sum of line resistances of electrodes including the metal pattern having the line width between 1 μm or more and 8 μm constituting one unit sensing cell among a plurality of unit sensing cells is 30.2Ω or more and 90Ω or less, the plurality of unit sensing cells correspond to an active region where the first sensing electrode and the second sensing electrode intersect, wherein a size of a pitch of one unit sensing cell among the plurality of unit sensing cells is 50 μm or more and 110 μm or less.

2. The high performance touch sensor of claim 1, wherein, in a plan view of the electrode including the metal pattern among the first sensing electrode and the second sensing electrode, unit patterns constituting the metal pattern do not intersect each other.

3. The high performance touch sensor of claim 2, wherein the unit patterns constituting the metal pattern have a stripe shape.

4. The high performance touch sensor of claim 3, wherein a boundary surface of the unit patterns having the stripe shape has a curved shape.

5. The high performance touch sensor of claim 1, further comprising a pad electrode connected to the electrode including the metal pattern among the first sensing electrode and the second sensing electrode.

6. The high performance touch sensor of claim 5, wherein the pad electrode is made of the same material as the electrode including the metal pattern among the first sensing electrode and the second sensing electrode.

7. The high performance touch sensor of claim 5, wherein the protective layer partially covers the pad electrode.

8. The high performance touch sensor of claim 5, further comprising a pad protection electrode formed on the pad electrode to protect the pad electrode.

9. The high performance touch sensor of claim 1, wherein a sheet resistance of the electrode having the triple-layered structure among the first sensing electrode and the second sensing electrode is 3 Ω/sq or more and 10 Ω/sq or less.

10. The high performance touch sensor of claim 1, wherein a light transmittance of the electrode having the triple-layered structure among the first sensing electrode and the second sensing electrode is 80% or more and 93% or less.

11. The high performance touch sensor of claim 1, wherein a light transmittance of the touch sensor including the substrate, the first sensing electrode, the insulating layer, the second sensing electrode, and the protective layer is 80% or more and 90% or less.

12. The high performance touch sensor of claim 1, wherein the electrodes including the thin film metal and the metal pattern include at least one selected from the group consisting of silver (Ag), copper (Cu), calcium (Ca), nickel (Ni), aluminum (Al), chromium (Cr), molybdenum (Mo), cobalt (Co), titanium (Ti), palladium (Pd), indium (In), tungsten (W), cadmium (Cd), and an alloy thereof.

13. The high performance touch sensor of claim 1, further comprising a separation layer formed between the substrate and the first sensing electrode.

14. The high performance touch sensor of claim 13, further comprising an inner protective layer formed between the separation layer and the first sensing electrode.

* * * * *